(No Model.)
J. RUCH.
VEHICLE SEAT.
No. 489,569.
Patented Jan. 10, 1893.
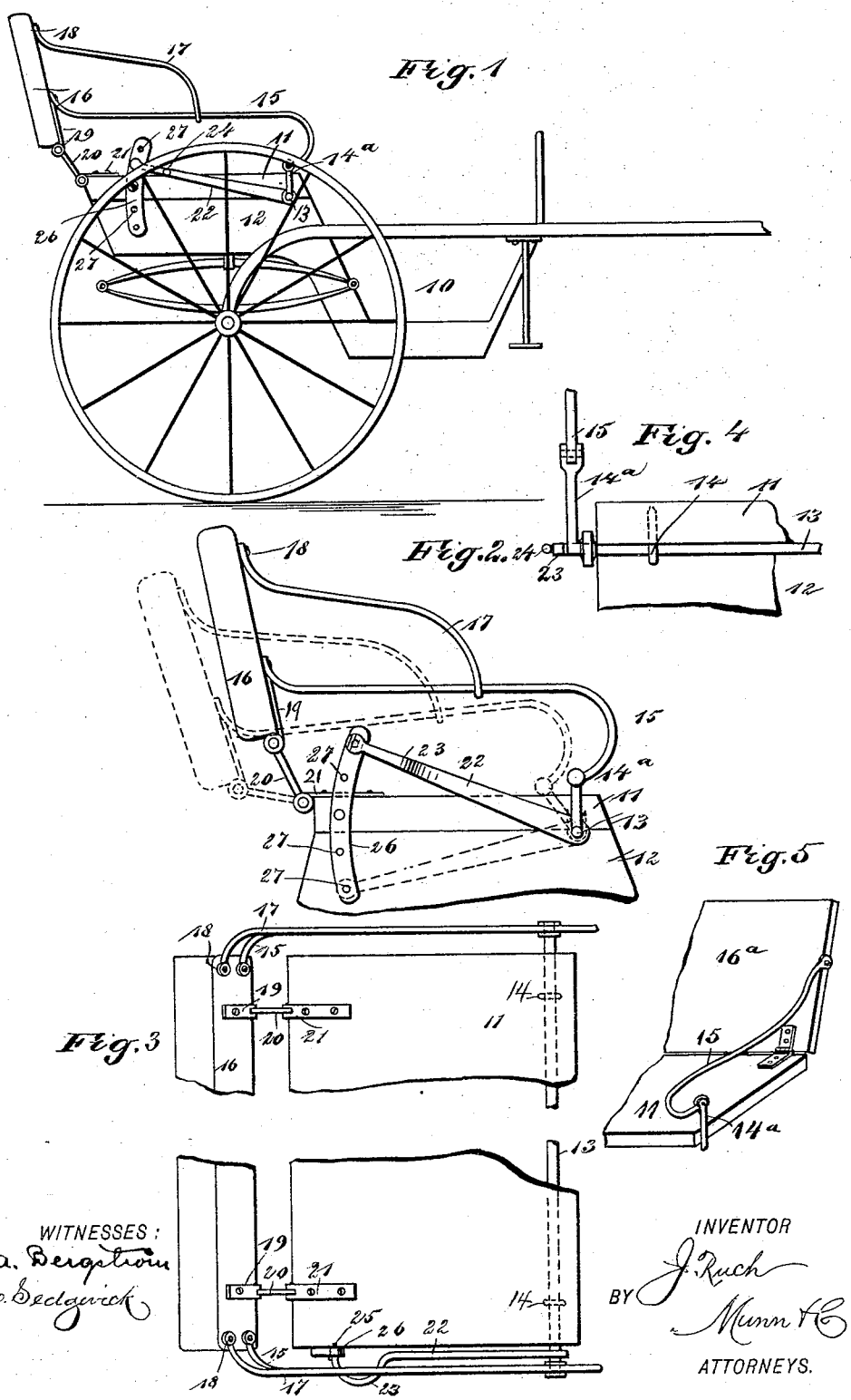
WITNESSES:
J. A. Bergstrom
C. Sedgwick
INVENTOR
J. Ruch
BY
Munn & Co.
ATTORNEYS.

UNITED STATES PATENT OFFICE.

JACOB RUCH, OF MOUNT EATON, OHIO.

VEHICLE-SEAT.

SPECIFICATION forming part of Letters Patent No. 489,569, dated January 10, 1893.

Application filed March 17, 1892. Serial No. 425,301. (No model.)

*To all whom it may concern:*

Be it known that I, JACOB RUCH, of Mount Eaton, in the county of Wayne and State of Ohio, have invented a new and Improved Vehicle-Seat, of which the following is a full, clear, and exact description.

My invention relates to improvements in vehicle seats and the connections between the seat and the vehicle body, and the object of my invention is to produce a seat which is especially adapted for two-wheeled vehicles such as road carts, and which is provided with means for shifting the position of the seat back, to the end that the seat may be made easy, and that it may be also adjusted so as to bring the weight of the load in the right position in relation to the wheels, thus enabling the vehicle to be properly balanced, so that it will ride and draw easily.

To this end my invention consists in a vehicle seat, the construction of which will be hereinafter described and claimed.

Reference is to be had to the accompanying drawings forming a part of this specification, in which similar figures of reference indicate corresponding parts in all the views.

Figure 1 is a broken side elevation of a road cart provided with my improved seat and attachments; Fig. 2 is a broken side elevation of the seat and attachments on an enlarged scale; Fig. 3 is a broken plan view of the seat; Fig. 4 is a broken detail front elevation of the seat, showing the manner in which the crank rod is secured thereto; and Fig. 5 is a broken perspective view of a modified form of seat.

The road cart 10, may be of any approved construction, and it is provided with a seat 11, which is secured to the body 12 in the usual way, and the seat may be secured to any kind of a two-wheeled vehicle. Extending longitudinally beneath the seat and near its front edge, is a crank rod 13, which is held to turn in keepers 14, and which has at its ends, upwardly-extending cranks 14ª, these being arranged at each side of the seat. The upper ends of the cranks 14ª are pivoted to the front ends of the curved arms 15, which arms may be of any approved shape, and these arms extend backward and are secured to the seat back 16. The seat back 16 is also braced by the braces 17, which are secured to the arms 15 at their lower ends, and which at their upper and rear ends are fixed to the seat back as shown at 18 in Figs. 1 and 2. On the lower portion of the seat back 16, are straps 19, which project from the lower edge of the seat back, and to these are pivoted the pivot posts 20, which extend downward and forward and are hinged to the metallic straps or butts 21, which are similar to the straps 19, and are fixed to the seat 11, so as to project from the rear edge thereof.

Fixed to one end of the crank rod 13, is a lever 22, which extends rearward along one side of the seat and which is bent outward and then inward near its free end to form a handle 23. The free end of the lever terminates in an inwardly-extending point 25, which is adapted to enter the holes 27 in the curved fastening plate 26 which is secured to one edge of the seat, and the holes are produced transversely in the plate adjacent to its ends. The curve of the fastening plate 26 corresponds to the arc of the circle in which the free end of the lever 22 swings, and it will be seen that by moving this lever 22, either up or down, the crank rod 13 may be moved so as to move the cranks 14ª either backward or forward, and these acting on the seat back 16, will cause it to move either backward or forward as the case may be, and as shown by dotted lines in Fig. 2, and the seat back by having its position changed, will change the position of the load of the vehicle, that is, of the persons riding on the seat, so that the vehicle may be always nicely balanced by simply adjusting the lever 22. By use of these pivoted posts 20, the seat back may be adjusted forward or backward bodily, with but little or no change of its angle to the fixed seat bottom, a result which is unattainable when the said posts are dispensed with.

To adjust the lever, the point 25 is pulled out of the plate 26, the lever is moved to the desired position, and the point again inserted in one of the holes 27 of the plate. The lever 22 should be made of spring metal, and the spring of the lever will then serve to hold the point in engagement with the fastening plate. It will be understood that the fastening plate may be secured to the seat and body instead of the seat, with the same effect.

In Fig. 5, I have shown a slightly modified form of seat, in which the seat back 16ª, is hinged to the back edge of the seat 11, thus doing away with the pivot posts 20 and their supporting straps, but the crank rod 13, the cranks 14ª and the arms 15, are used, the arm having its front end pivoted to the crank 14ª and its rear end pivoted to the end of the seat back. The lever 22 and fastening plate 26 are also used, the only difference between this and form shown in the main views, being that the back pivot posts and brace 17 are dispensed with and the seat back hinged directly to the seat.

Having thus described my invention, I claim as new, and desire to secure by Letters Patent,—

1. The combination with a stationary seat, of the adjustable back, 16, the posts, 20, which are pivoted to both said seat and back, and means for adjusting the back, as shown and described, whereby the latter may be adjusted forward or back without materially changing its angle to the seat, as specified.

2. The combination, with the seat and the seat back hinged thereto, of a crank rod mounted on the under side of the seat, arms pivoted to the cranks of the rod and secured to the seat back, a lever secured to the crank rod, and a fastening device to fix the position of the lever, substantially as described.

3. A seat for two-wheeled vehicles, comprising a stationary bottom, a back hinged to the bottom, a crank rod mounted on the bottom and having a crank at each end, arms secured to the seat back and pivoted to the cranks, a lever fixed to one end of the crank rod, said lever having a point at its free end, and a perforated fastening plate secured to the seat and adapted to engage the free end of the lever, substantially as described.

JACOB RUCH.

Witnesses:
CHAS. MCCLELLAND,
F. A. MAURER.